United States Patent
Liu et al.

(10) Patent No.: US 10,917,336 B2
(45) Date of Patent: Feb. 9, 2021

(54) ROUTING DEVICE WITH INDEPENDENT SERVICE SUBSYSTEM

(71) Applicant: Microsoft Technology Licensing, LLC, Redmond, WA (US)

(72) Inventors: Yunxin Liu, Beijing (CN); Qi Luo, Beijing (CN); Lintao Zhang, Beijing (CN); Qiufeng Yin, Beijing (CN); Ming Wu, Beijing (CN); Feng Zhao, Beijing (CN); Sam Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/744,288

(22) PCT Filed: Jul. 27, 2016

(86) PCT No.: PCT/US2016/044147
§ 371 (c)(1),
(2) Date: Jan. 12, 2018

(87) PCT Pub. No.: WO2017/039882
PCT Pub. Date: Mar. 9, 2017

(65) Prior Publication Data
US 2018/0212868 A1     Jul. 26, 2018

(30) Foreign Application Priority Data

Aug. 31, 2015 (CN) .......................... 2015 1 0547932

(51) Int. Cl.
*H04L 12/725* (2013.01)
*H04L 12/26* (2006.01)
(Continued)

(52) U.S. Cl.
CPC ........ *H04L 45/306* (2013.01); *H04L 41/5054* (2013.01); *H04L 43/10* (2013.01);
(Continued)

(58) Field of Classification Search
CPC ... H04L 45/306; H04L 41/5054; H04L 43/10; H04L 45/02; H04L 45/22; H04L 45/74
(Continued)

(56) References Cited

U.S. PATENT DOCUMENTS 6,393,026 B1   5/2002   Irwin
6,578,084 B1   6/2003   Moberg et al.
(Continued)

FOREIGN PATENT DOCUMENTS

| CN | 101782899 A | 7/2010 |
|---|---|---|
| CN | 102891882 A | 1/2013 |
| WO | 2015100530 A1 | 7/2015 |

OTHER PUBLICATIONS

"Office Action Issued in Chinese Patent Application No. 201510547932.2", dated Mar. 1, 2019, 14 Pages., English translation.
(Continued)

*Primary Examiner* — Christopher R Crompton
(74) *Attorney, Agent, or Firm* — International IP Law Group, PLLC (57) ABSTRACT

Various systems and methods for providing network services are described herein. In one example, a method includes receiving, via a first processor, a network packet from a source device. The method can also include sending, via the first processor, the network packet to a second processor if a service subsystem and a service are responsive. Furthermore, the method can include modifying, via the second processor, the network packet or generating a new packet based on the service. The method can also include receiving, via the first processor, the modified network packet or the
(Continued)

new network packet from the second processor. The method can also further include sending, via the first processor, the modified network packet or the new network packet to a destination device.

20 Claims, 5 Drawing Sheets

(51) Int. Cl.
  *H04L 12/741* (2013.01)
  *H04L 12/24* (2006.01)
  *H04L 12/751* (2013.01)
  *H04L 12/707* (2013.01)

(52) U.S. Cl.
  CPC .............. *H04L 45/02* (2013.01); *H04L 45/22* (2013.01); *H04L 45/74* (2013.01)

(58) Field of Classification Search
  USPC .......................................................... 370/351
  See application file for complete search history.

(56) References Cited

U.S. PATENT DOCUMENTS

| | | | |
|---|---|---|---|
| 7,047,092 B2 | 5/2006 | Wimsatt | |
| 7,218,632 B1 | 5/2007 | Bechtolsheim et al. | |
| 7,535,823 B1* | 5/2009 | Malhotra | H04Q 3/66 370/216 |
| 7,735,139 B1* | 6/2010 | Chou | H04L 63/145 709/224 |
| 7,860,006 B1* | 12/2010 | Kashyap | H04L 41/0893 370/235 |
| 8,327,114 B1* | 12/2012 | Cismas | G06F 11/2051 712/16 |
| 8,339,959 B1 | 12/2012 | Moisand et al. | |
| 8,650,311 B2 | 2/2014 | Dattagupta et al. | |
| 8,724,639 B2 | 5/2014 | Mahmoud | |
| 9,088,508 B1* | 7/2015 | Caputo, II | H04L 47/10 |
| 9,119,109 B1* | 8/2015 | Dubrovsky | H04L 47/2433 |
| 2006/0136722 A1* | 6/2006 | Ogura | G06F 21/56 713/168 |
| 2006/0153204 A1* | 7/2006 | Wang | H04L 63/0227 370/400 |
| 2006/0161270 A1 | 7/2006 | Luskin et al. | |
| 2007/0169169 A1* | 7/2007 | Zheng | H04L 63/105 726/1 |
| 2013/0124715 A1 | 5/2013 | Averbuch et al. | |
| 2013/0298222 A1* | 11/2013 | Zuk | H04L 63/0227 726/13 |
| 2015/0109104 A1 | 4/2015 | Fadell et al. | |
| 2015/0116108 A1 | 4/2015 | Fadell et al. | |
| 2015/0172159 A1* | 6/2015 | Ficara | G06F 9/4498 706/46 |
| 2015/0347683 A1* | 12/2015 | Ansari | H04L 9/30 726/7 |
| 2016/0044054 A1* | 2/2016 | Stiansen | H04L 63/1416 726/24 |
| 2016/0323193 A1* | 11/2016 | Zhou | H04L 69/22 |

OTHER PUBLICATIONS

"Second Written Opinion Issued in PCT Application No. PCT/US2016/044147", dated Jul. 26, 2017, 5 Pages., English.

International Search Report and the Written Opinion of the International Searching Authority Issued for PCT Application No. PCT/US2016/044147, dated Nov. 7, 2016, 10 pages.

"Awaken Your Home", Retrieved from: http://web.archive.org/web/20150314232547/https://home-assistant.io/, Retrieved Date: Mar. 14, 2015, 2 Pages.

"HomeTroller Zee Home Automation Controller", Retrieved from: http://web.archive.org/web/20140704105406/http://www.homeseer.com/pdfs/brochures/HomeTroller-Zee-2014.pdf, Retrieved Date: Jul. 4, 2014, 2 Pages.

"OpenHAB Features", Retrieved from: http://web.archive.org/web/20140227013840/http://www.openhab.org/features.html, Retrieved Date: Feb. 27, 2014, 2 Pages.

"Update: SmartThings Hub & Hardware V2", Retrieved from: http://blog.smartthings.com/news/smartthings-updates/update-smartthings-hub-v2-hardware/, Mar. 31, 2015, 11 Pages.

Burnham, Ted, "Expandable Smart Home Hub: Stack Box", Retrieved from: http://web.archive.org/web/20141011081627/http://postscapes.com/expandable-smart-home-hub-stack-box, Retrieved Date: Oct. 11, 2014, 3 Pages.

Cericola, Rachel, et al., "Hive Packs Entertainment, Security & Control into Smart Home Hub", Retrieved From: http://web.archive.org/web/20150307190023/http://www.electronichouse.com/daily/smart-home/hive-packs-entertainment-security-control-into-smart-home-hub/, Mar. 4, 2015, 2 Pages.

E-Man, Martin, "Buildyoursmarthome", Retrieved from: http://web.archive.org/web/20150304060110/http://buildyoursmarthome.co/reviews/best-z-wave-controller/, Nov. 1, 2014, 12 Pages.

Tolentino, Mellisa, "New Router Doubles as Smart Home Hub", Retrieved from: https://siliconangle.com/2015/04/14/new-router-doubles-as-smart-home-hub/, Apr. 14, 2015, 3 Pages.

"Office Action Issued in European Patent Application No. 16747971.6", dated Jun. 22, 2020, 3 Pages.

"Third Office Action and Search Report Issued in Chinese Patent Application No. 201510547932.2", dated Sep. 15, 2020, 16 Pages.

Wan-Jun, et al., "Approach of workflow exception handling modeling based on OWL", In Journal of Jilin University, vol. 41, No. 3, May 31, 2011, 6 Pages.

"Decision on Rejection Issued in Chinese Patent Application No. 201510547932.2", dated Jan. 3, 2020, 7 Pages.

* cited by examiner

ROUTING DEVICE WITH INDEPENDENT SERVICE SUBSYSTEM

CROSS-REFERENCE TO RELATED APPLICATIONS

Pursuant to 35 U.S.C. § 371, this application is the United States National Stage Application of International Patent Application No. PCT/U.S.2016/044147, filed Jul. 27, 2016, the contents of which are incorporated by reference as if set forth in their entirety herein, which claims priority to Chinese Application No. 201510547932.2, filed on Aug. 31, 2015, the contents of which are incorporated by reference as if set forth in their entirety herein.

BACKGROUND

Computing devices may communicate with each other through a network. A router is a computer networking device configured to forward data packets between computer networks. A data packet may typically be forwarded from one router to another through the networks that constitute the Internet until the packet reaches its destination node. For example, in a local area network, a router may be configured to provide internet access to computing devices within the local area network. Routers may also be configured to provide additional services such as filtering of packets or security access control.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides for a system for providing network services. The system includes a routing subsystem to receive a network packet from a source device and send the network packet to a destination device. The system can also include a service subsystem to receive the network packet from the routing subsystem if a service is enabled. The service subsystem can also process the network packet based on the enabled service. The service subsystem can also further send the modified network packet to the routing subsystem. The routing subsystem can forward the modified network packet to a destination address in response to receiving the modified network packet from the service subsystem.

Another embodiment provides a method for providing network services. The method includes receiving, via a first processor, a network packet from a source device. The method can also include sending, via the first processor, the network packet to a second processor if a service subsystem and a service are responsive. Furthermore, the method can include modifying, via the second processor, the network packet or generating a new network packet based on the service. The method can also include receiving, via the first processor, the modified network packet or the new network packet from the second processor. The method can also further include sending, via the first processor, the modified network packet or the new network packet to a destination device.

Another embodiment provides for one or more computer-readable storage devices for storing computer-readable instructions that, when executed by one or more processing devices, cause the one or more processing devices to receive a network packet from a source device at a first processing device. The instructions can also cause the one or more processing devices to process the network packet based on an enabled service application at a second processing device. The instructions can also further cause the one or more processing devices to send the processed network packet to a destination device.

BRIEF DESCRIPTION OF THE DRAWINGS

The following detailed description may be better understood by referencing the accompanying drawings, which contain specific examples of numerous features of the disclosed subject matter.

DETAILED DESCRIPTION

As discussed above, a router may be configured to provide additional services. For example, the router may be configured with firmware allowing extensibility of services and configure one or more additional services on the router. The firmware may be, for example, any suitable open source firmware, among others. The network administrator may use a web browser on a device in the router's LAN environment to access a website on the router, sign in with a user name and password, and update the firmware and configure the services. However, some services may be processor intensive. For example, antivirus scanning services can use significant processor resources. Further, in some cases, the additional services may cause the router to crash. If the router crashes, basic routing functionality can be affected. For example, network traffic associated with the router may come to a halt until the router is reset or rebooted. Thus, such additional services may create a maintenance burden for the user of a home router as well as create network instability.

The techniques described herein include a router with two independent subsystems for providing routing functionality and additional services. In other words, the techniques described herein may provide an additional, independent processor for processor-intensive applications such as antivirus scanning. For example, the processor can be an application processor that is in addition to a routing system-on-chip processor.

The example techniques may employ a monitoring module to determine whether a service subsystem is responsive. In this scenario, the routing subsystem can send network packets to the service subsystem if the services subsystem is enabled and responsive. If the service subsystem is disabled or unresponsive, then the routing subsystem can send the packets directly to the destination device. In this scenario, the routing functionality of the routing subsystem is unaffected if the service subsystem fails. Thus, the techniques described herein can provide both improved reliability of the routing functionality of the routing device and the increased extensibility of adding new functionalities on the routing device. For example, even if new service software crashes, the service software will only crash the service processor, but the router processor may still work. In some examples, the service processor and the router processor can be virtual processors that separately run the services and the routing functionality. Thus, the reliability of the routing functionality is also improved. Moreover, the application processor can run a full-fledged operating system and thus enables the ability to add new software functionalities for improved extensibility.

Figure 1:
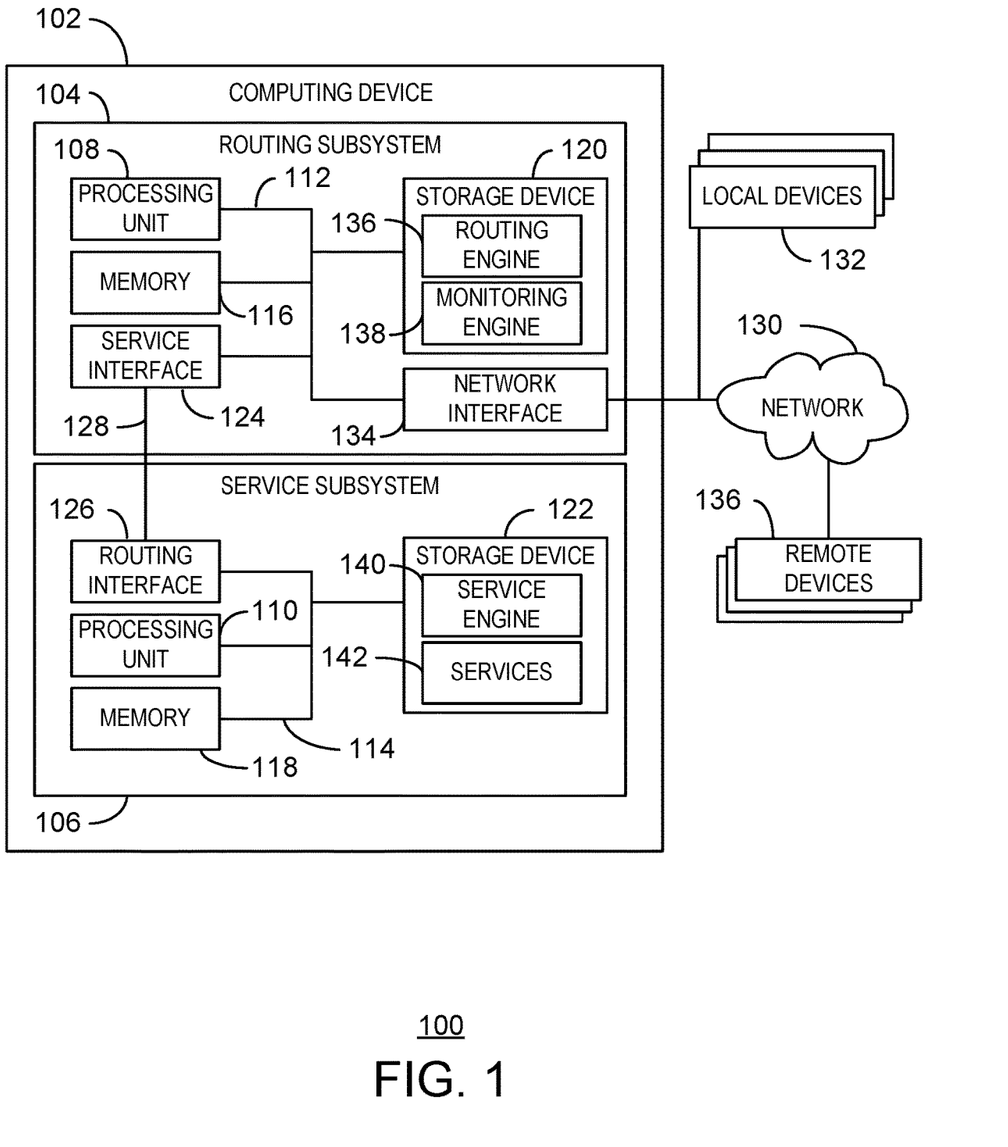
FIG. 1 is a block diagram illustrating an example of a computing system configured to provide network services to local and remote devices.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not computer-readable storage media) may additionally include communication media such as transmission media for wireless signals and the like.

FIG. 1 is a block diagram illustrating an example of a computing system configured to provide network services to local and remote devices. The computing system 100 may include a computing device 102 that may be, for example, a hub, router, smart hub, smart router, and the like.

The computing device 102 may include a routing subsystem 104 and a service subsystem 106. The routing subsystem 104 may have a processing unit 108 that is adapted to execute stored instructions. For example, the routing subsystem 104 may be configured to run the basic routing functionality on the dedicated router hardware. The processing unit 108 of the routing subsystem 104 can be a socket-on-chip processor or the like.

The service subsystem 106 may also have a processing unit 110 that is adapted to execute stored instructions. For example, the service subsystem 106 may include any suitable operating system. Thus, the service subsystem 106 can support the addition of new software functionalities and thus provide additional application extensibility. In some examples, the software stack (operating system and applications) of the service subsystem 106 can be much more complicated than the software stack of the routing subsystem 104. The processing unit 110 of the service subsystem 106 can be any of various available processors. For example, the processing unit 110 can be an ARM® processor. However, dual microprocessors and other multiprocessor architectures also can be employed as the processing unit 110. The processor 110 can be a single core processor, a multi-core processor, a computing cluster, or any number of other configurations. In some examples, a first processing unit 108 and a second processing unit 110 can reside on a single circuit board and can be coupled via a computer bus 128. In some examples, the processing units 108, 110 may be distinct virtual processors running on one or more physical processing units.

The processing units 108, 110 may be coupled to other system components via system buses 112, 114. For example, the subsystem buses 112, 114 can couple the processing units 108, 110 to subsystem memory 116, 118, respectively. The memory units 116, 118 may be non-persistent memory in relation to storage devices 120, 122 that may include a hard disk drive, for example. The storage devices 120, 122 can include a hard drive, an optical drive, a Universal Serial Bus (USB) flash drive, an array of drives, or any combinations thereof. The storage devices 120, 122 may be coupled to the processing units 108, 110 and memory units 116, 118 via the subsystem buses 112, 114.

The memory units 116, 118 can include random access memory (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.)), flash memory, or any other suitable memory systems. The instructions executed by the processing units 108, 110 may be used in providing network services.

The processing unit 108 may be connected through the subsystem bus 112 (e.g., Peripheral Component Interconnect (PCI), Industry Standard Architecture (ISA), PCI-Express, NuBus, etc.) to a service interface 124. The processing unit 110 may be connected through the subsystem bus to a routing interface 126. The service interface 124 can be connected to the routing interface 126 via a system bus 128. The system bus 128 can include, for example, Peripheral Component Interconnect (PCI), Industry Standard Architecture (ISA), PCI-Express, NuBus, etc. In some examples, the system bus 128 can be an Ethernet cable and the service interface 124 and the routing interface 126 can be network interfaces.

The subsystem bus 112 can connect the processor 108 to a network 130 and local devices 132 via a network interface 134. The network interface 134 encompasses communication networks such as local-area networks (LAN) and wide-area networks (WAN). LAN technologies include Fiber Distributed Data Interface (FDDI), Copper Distributed Data Interface (CDDI), Ethernet, Token Ring and wireless technologies such as Wi-Fi® and the like. WAN technologies include, but are not limited to, point-to-point links, circuit switching networks like Integrated Services Digital Networks (ISDN) and variations thereon, packet switching networks, and Digital Subscriber Lines (DSL). A communication connection (not shown) can include the hardware/software employed to connect the network interface 134 to the subsystem bus 112. The communication connection can be inside the routing subsystem 104 or external to the computing device 102. The hardware/software for connection to the network interface may include, for example, internal and external technologies such as, mobile phone switches, modems including regular telephone grade modems, cable modems and DSL modems, ISDN adapters, and Ethernet cards.

The storage device 120 of the routing subsystem 104 can include one or more modules such as a routing engine 136 and a monitoring engine 138. The routing engine 136 can be configured to receive a network packet from a source device and send the network packet to a destination device. In some examples, the routing engine 136 can be configured to send the network packet to a service subsystem 106 via a service interface 124 in response to detecting that a service is enabled on the service subsystem 106. The routing engine 136 can further be configured to receive a processed network packet from the service subsystem 106 and forward the processed network packet to a destination address in response to receiving the network packet from the service subsystem 106. The monitoring engine 138 can be configured to monitor a service on the service subsystem 106. The monitoring engine 138 can restart the service on the service subsystem 106 in response to the monitoring engine 138 detecting that the service is unresponsive. For example, the routing subsystem 104 can send the network packet directly to the destination device in response to the monitoring engine 138 detecting that the service or the service subsystem 106 is unresponsive. In some examples, the monitoring engine 138 can further restart the service subsystem 106 in response to the monitoring engine 138 detecting that the service subsystem 106 is unresponsive.

The storage device 122 of the service subsystem 106 can also include a service engine 140 and associated services 142. The service engine 140 can be configured to receive the network packet from the routing subsystem in response to detecting that a service is enabled. The service engine 140 can be configured to process the network packet based on the enabled service. The service engine 140 can further be configured to send the processed network packet to the routing subsystem 104. In some examples, the associated services 142 can include antivirus scanning and Internet of Things (IoT) device management, among other possible services 142. As used herein, IoT devices can include devices embedded with electronics, software, sensors, and connectivity to enable the device to exchange data with the producer of the devices, the operator of the devices, and/or other connected devices.

In some examples, the routing subsystem 104 can create a virtual local area network to associate with the service subsystem 106. For example, the routing subsystem 104 can assign internet protocol addresses to the virtual local area network that are undiscoverable outside of the routing subsystem 104. In some examples, the routing subsystem 104 can send the network packet directly to the destination device if the monitoring module detects the service 142 or the service subsystem 106 is unresponsive. For example, the service 142 or service subsystem 106 may have been disabled or the service 142 or service subsystem 106 may have crashed.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional engines, additional memory devices, additional network interfaces, additional local and/or remote devices, etc.). Furthermore, any of the functionalities of the routing engine 136, the monitoring engine 138, and the service engine 140, can be partially, or entirely, implemented in hardware and/or in one or more processors. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 2:
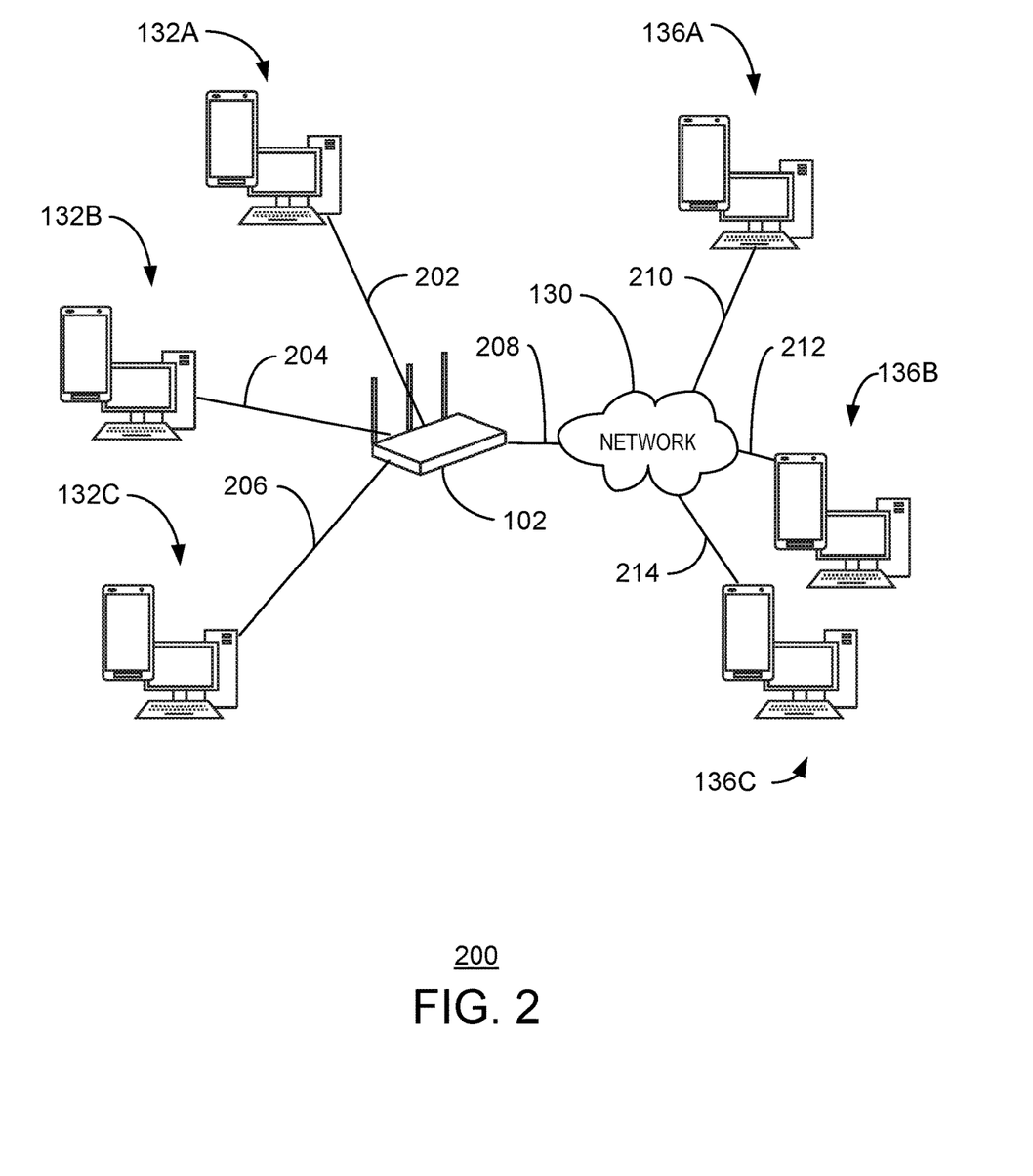
FIG. 2 is a diagram illustrating an example of a computing system environment configured to provide network services to local and remote devices.

FIG. 2 is a diagram illustrating an example of a computing system environment configured to provide network services to local and remote devices. In some cases, the computing system environment 200 may include a set of local device 132A, 132B, 132C coupled to a computing device 102 via connections 202, 204, 206. The routing device may further be coupled to a network 130 coupled to remote devices 136A, 136B, 136C via connections 210, 212, 214.

In FIG. 2, the computing device 102 may be a router. The router may offer a plurality of services to any of local devices 132A, 132B, 132C or remote devices 136A, 136B, 136C. For example, the local device 132A, 132B, 132C may be smart devices in an Internet of Things (IoT) network created by the router 102. In some examples, the router 102 can provide services such as connection, management, control and/or security of the IoT devices. For example, a smart light can be automatically turned on by the router 102 when a motion is detected by a motion detection IoT device. In some examples, the router 102 can provide streaming services as a media server. For example, the router 102 can stream media content to other media rendering devices in the environment 200.

Moreover, from a user or device point of view, the service subsystem providing the service as discuss in FIG. 1 above is invisible and operates transparently. Thus, from the point of view of a user or any of the devices 132A, 132B, 132C, 136A, 136B, 136C, the router 102 may appear to be a standard home router, for example. In some examples, this can be achieved by creating a dedicated Virtual LAN (VLAN) for the service subsystem in the computing device or router 102. As a router, the routing subsystem of the computing device or router 102 can control the network configurations and provide two or more VLANs, each using a different subnet. A first subnet may be used for all other devices to connect to the router 102 for Internet access. For example, a first VLAN can have a subnet of 192.168.1.0/24 with a subnet mask of 255.255.255.0. When a device 132A, 132B, 132C is connected to the router 102, the routing subsystem can allocate an IP address from 192.168.1.2 to 192.168.1.254 for the device. For example, the IP address can be 192.168.1.100, among others. The IP addresses 192.168.1.1 and 192.168.1.255 are generally reserved IP addresses, and usually a router will be assigned the IP address of 192.168.1.1. The routing functionality can be the same as a standard router. However, internally, the routing subsystem can create a second VLAN. For example, the second VLAN may have a subnet of 192.168.2.0/24 with a subnet mask of also 255.255.255.0 and allocate an IP address to the service subsystem from 192.168.2.2 to 192.168.2.254. For example, the service subsystem may have an IP address of 192.168.2.100. The routing subsystem can communicate with the service subsystem using the IP address 192.168.2.100, which is not visible by other home devices. The routing subsystem may also have an IP address in subnet 192.168.2.0/24, e.g., 192.168.2.1.

To implement services and functionalities such as anti-virus scanning, the service subsystem can check each network packet sent or received by the devices 132A, 132B, 132C, 136A, 136B, 136C. For example, the routing subsystem may be configured to forward any number of the network packets to the service subsystem. The service subsystem can modify the packets and then send the modified packets back to the routing subsystem as discussed in detail with respect to FIG. 3 below. This procedure can be transparent to other devices. For example, if a PC 132A with an IP address of 192.168.1.200 sends a packet to the router 102 with an IP address of 192.168.1.1, the routing subsystem of the router 102 can automatically forward the packet to the IP address the service subsystem. After the network packet is modified by the service subsystem, the modified network packet can be sent back to the routing subsystem. The routing subsystem can then send the modified network packet to its final destination. For example, the final destination may be a remote personal computer 136A, a smart phone 136A, or a web server 136A on the Internet. Similarly, when the router 102 receives a network packet from a remote personal computer 136A, smart phone 136A, or web server 136A to be sent to the local smart phone, home PC, or server 132A, the routing subsystem can also forward the network packet to the service subsystem first before sending the network packet to the local smart phone, home PC, or server 132A.

In some examples, the routing subsystem can also run a monitor engine to monitor the status of the service subsystem and the services of the service subsystem. For example, a service can be one or more functionalities running in the service subsystem such as anti-virus scanning. If the routing subsystem detects that the service subsystem or one of its services has stopped working, the routing subsystem can restart the service subsystem or the affected service. The monitoring functionality is discussed in greater detail with respect to the method of FIG. 4 below.

The diagram of FIG. 2 is not intended to indicate that the example computing system environment 200 is to include all of the components shown in FIG. 2. Rather, the example computing system environment 200 can include fewer or additional components not illustrated in FIG. 2 (e.g., additional local devices, remote devices, networks, routers, etc.)

Figure 3:
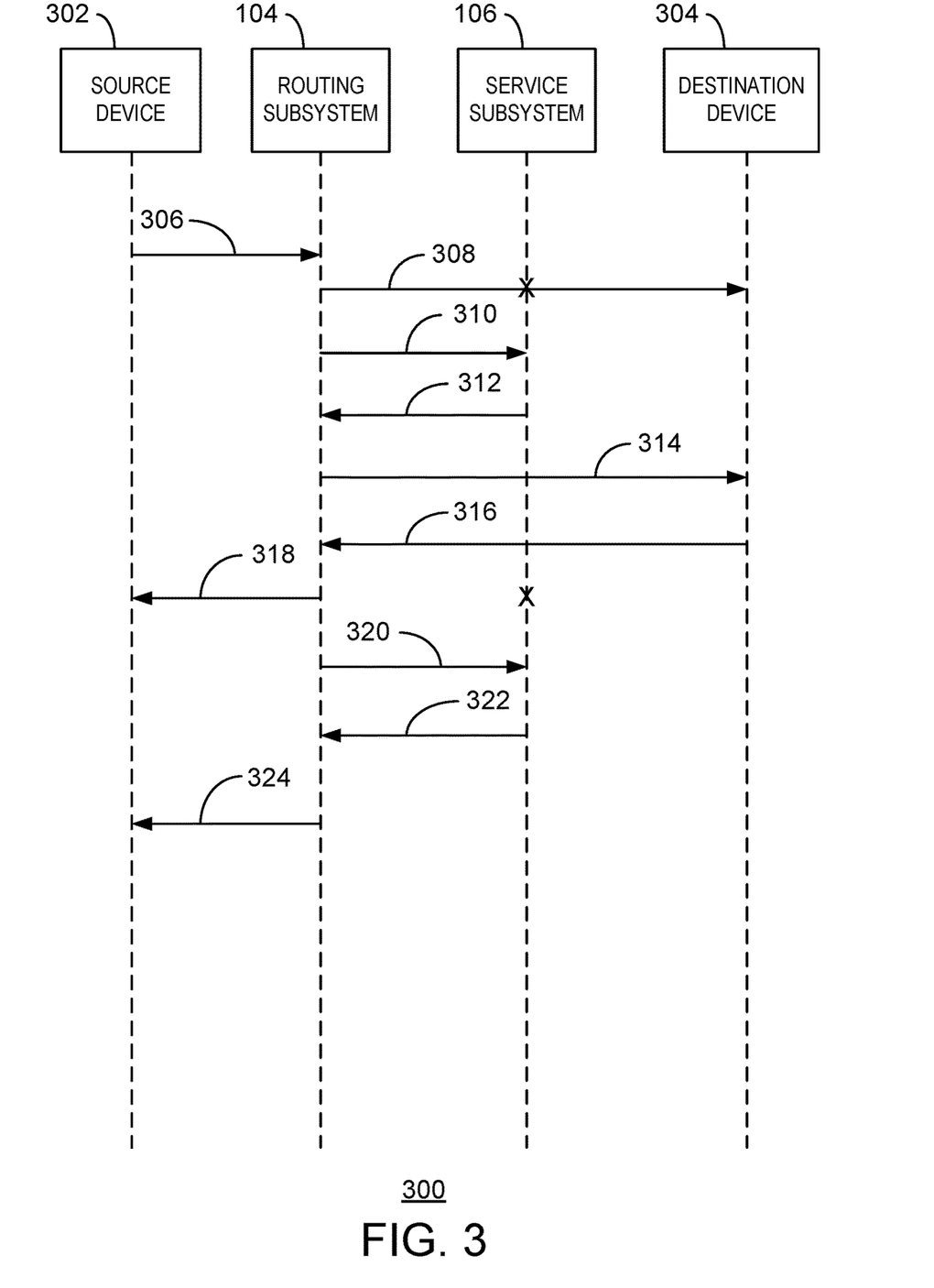
FIG. 3 is a timing diagram for transmitting a data packet between a source device and a destination device via a routing subsystem and a service subsystem.

FIG. 3 is a timing diagram for transmitting a data packet between a source device and a destination device via a routing subsystem and a service subsystem. The timing diagram is generally referred to by the reference number 300. In FIG. 3, a source device 302 may be configured to send network packets to a computing device including a routing subsystem 104 and service subsystem 106 as discussed above with regard to FIG. 1 and FIG. 2. The routing subsystem 104 may be configured to send the network packets to a destination device 304. For example, the destination device 304 can be a local device 132 or a remote device 136 as discussed in FIG. 1.

As indicated by arrow 306, the source device 302 sends a network packet to the routing subsystem 104. Upon receiving the network packet, the routing subsystem 104 can determine whether the service subsystem 106 is enabled and responsive. If the service subsystem 106 is disabled or unresponsive, then the process may continue at arrow 308 as indicated by the "X" at the service subsystem 106. If the service subsystem 106 is enabled and responsive, then the process can continue at arrow 310.

As indicated by arrow 308, the routing subsystem 104 sends the network packet directly to the destination device 304. As indicated by the "X" at the service subsystem 106, the routing subsystem 104 may have detected that the service subsystem 106 or one or more of its services is disabled or unresponsive. Thus, instead of sending the network packet to the disabled or unresponsive service subsystem 106, the source device 302 can send the network packet to the destination device 304. The process may then proceed at arrow 316.

As indicated by arrow 310, the routing subsystem 104 sends the network packet to the service subsystem 106. For example, the routing subsystem 104 may have detected that the service subsystem 104 and at least one service were both enabled and responsive and may forward the network packet to the service subsystem 106. In some examples, the service subsystem 106 can then modify the network packet based on the one or more services or replace the network packet with a new network packet. For example, an antivirus service may block a network packet destined to a website determined to host malware. In some examples, the service subsystem 106 can replace the network packet with a new network packet. For example, if a device is sending a packet to an external website and the service subsystem 106 determines that the external website is malicious, the service subsystem 106 can return a warning web page to the routing subsystem 104 via one or more new packets. For example, an antivirus scanner may prevent the network packet attempting to access a suspected malware website from leaving the service subsystem 106. In some examples, the antivirus scanner can scan network packets sent from and received by computers. For example, the scanner can prevent the download of malware from malicious websites. In some examples, the service subsystem 106 can replace malware packets with new network packets indicating that a virus was detected and blocked. The service subsystem 312 can send the new network packets to the routing subsystem 104 to forward to the requesting device. In some examples, if the source device 302 is sending a request packet for a local service, the service subsystem 106 can return a new packet to serve the request. For example, a file server may be hosted on the service subsystem 106, but, from the point of view of the source device 302, the file server may appear to be hosted on the router subsystem 104.

As indicated by arrow 312, the service subsystem 106 sends the modified network packet or new network packet to the routing subsystem 104. In some examples, the service subsystem 106 sends the original network packet to the routing subsystem 104. For example, if the service subsystem 106 determines that the external website is benign, the service subsystem 106 can returns the original packet to the router subsystem 104 to send the packet to the external website.

At block 314, the routing subsystem 104 can then send the modified network packet or new network packet to the destination device 304. For example, the routing subsystem 104 can forward warning web page packets to the device. In some examples, the service can prevent the original network packet from reaching the source device 302. In some examples, the routing subsystem 104 can send an original network packet to the destination device 304. For example, the network packet may have been scanned by an antivirus service and determined to be attempting to access a benign website.

As indicated by arrow 316, the routing subsystem 104 receives another network packet from the destination device 304. If the routing subsystem 104 detects that the service subsystem 106 is disabled or unresponsive, then the process may continue at block 318. If the routing subsystem 104 detects that the service subsystem and a service are both enabled and responsive, then the process may continue at block 320.

As indicated by arrow 318, the routing subsystem 104 sends the network packet directly to the source device 302. As again indicated by an "X" at the service subsystem 106, the routing subsystem 104 may have detected that the service subsystem 106 and/or one of the services of the service subsystem 106 were disabled or unresponsive.

As indicated by arrow 320, the routing subsystem 104 sends the network packet from the destination device 304 to the service subsystem 106. For example, the routing subsystem 104 may have detected that the service subsystem 106 and a service was both enabled and responsive. The service subsystem 106 may then modify the network packet via one or more of the services that may provide rich functionalities. For example, the service may be an antivirus scanner. The antivirus scanner can remove a malicious portion of the network packet. In some examples, the antivirus scanner can prevent the network packet from reaching the source device 302. For example, the antivirus scanner can intercept the network packet and replace the network packet with a packet containing a virus notification.

As indicated by arrow 322, the service subsystem 106 sends the modified network packet to the routing subsystem 104. For example, the network packet may have been modified by one of the services in block 320.

As indicated by arrow 324, the routing subsystem 104 sends the network packet to the source device 302. For example, the network packet may be a modified network packet.

Thus, the service process 300 may provide additional functionality and services with respect to any direction of communication between two or more devices. Moreover, if the service subsystem 106 fails at any point, or is otherwise disabled or unresponsive, the routing subsystem 104 can continue to operate by forwarding network packets and bypassing the service subsystem 104, as described in blocks 308 and 318 above. Thus, the service process 300 reduces the risk of system instability when installing new functionalities on the service subsystem. Even if the service subsystem 106 crashes, the routing subsystem 104 can still work as normal to serve all devices. For example, the routing subsystem 104 can continue to ensure that all devices can access the Internet and communicate with each other as normal.

Figure 4:
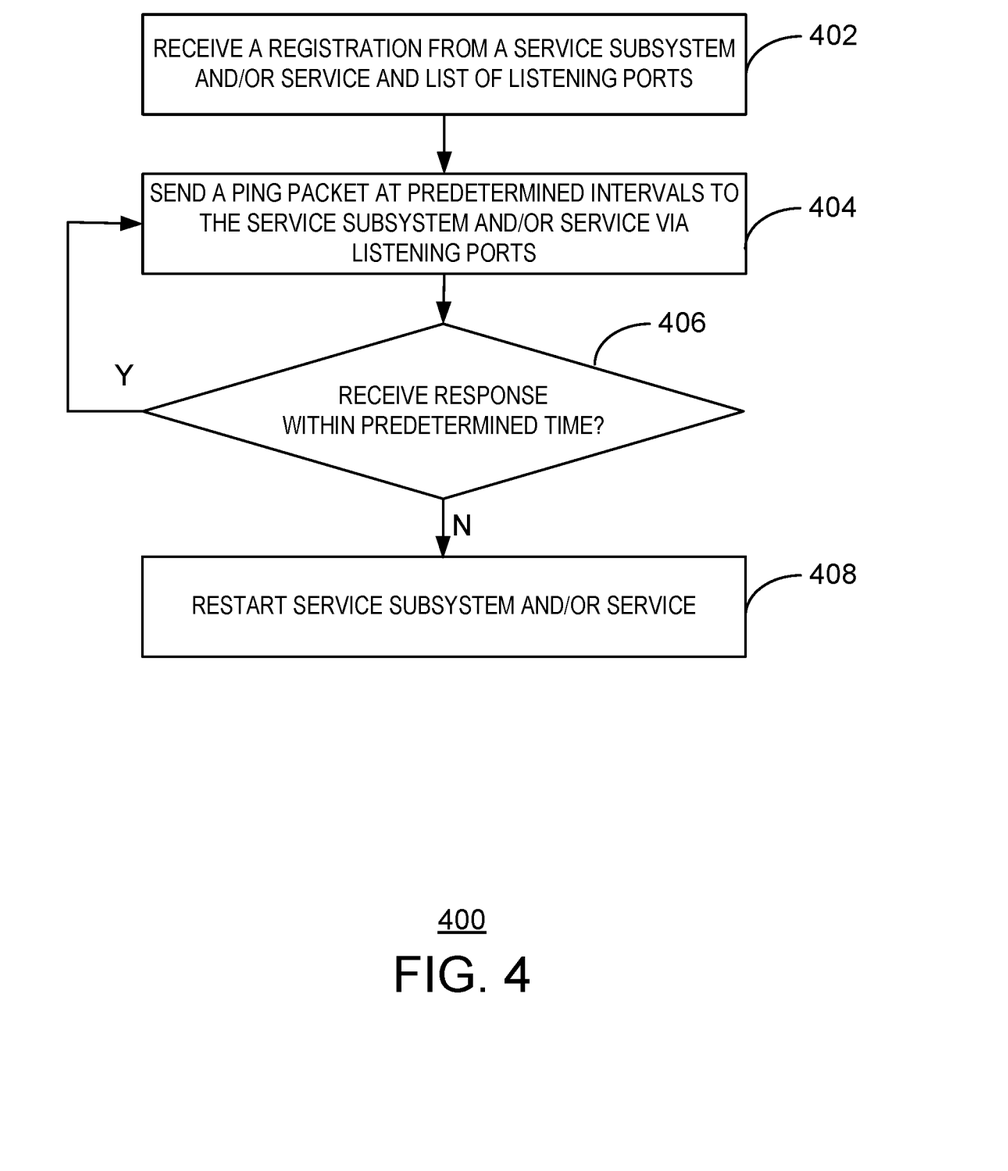
FIG. 4 is a block diagram illustrating a method for monitoring a service subsystem.

FIG. 4 is a block diagram illustrating a method for monitoring a service subsystem. The method is generally referred to by the reference number 400 and may be performed by the routing subsystem 104 of FIG. 1 above.

At block 402, the routing subsystem receives a registration packet from a service subsystem and/or a service and a list of listening ports. For example, the service subsystem and/or services can register with a monitor component of the routing subsystem and begin monitoring for ping packets at a User Datagram Protocol (UDP) port, among others. In some examples, the routing subsystem can receive a list of services to be monitored via a user configuration interface. For example, a user may preconfigure which services on the service subsystem should be monitored via the user configuration interface.

At block 404, the routing subsystem sends a ping packet at predetermined intervals to the service subsystem and/or the service via the listening ports. For example, in response to receiving a ping packet, the service subsystem or a service can reply with a response to indicate that the service system and/or service are still functioning and/or enabled.

At block 406, the routing subsystem determines whether a response was received from the service subsystem and/or service within a predetermined time. If the routing subsystem determines that a response was received within the predetermined time, then the method can return to block 404. If the routing subsystem determines that no response was received within the predetermined time, then the method may proceed at block 408.

At block 408, the routing subsystem restarts the service subsystem and/or the service. For example, if the monitor component of the routing subsystem does not receive the expected responses within the predetermined time, the monitor component can determine that the service subsystem or a service has stopped working and restart it. In some examples, the predetermined time can be based on the number of sent ping packets. For example, the routing subsystem can restart the service subsystem after a number of continuous ping packets without any response.

This block diagram is not intended to indicate that the blocks of the method 400 are to be executed in any particular order, or that all of the blocks are to be included in every case. Further, any number of additional blocks not shown may be included within the method 400, depending on the details of the specific implementation.

Figure 5:
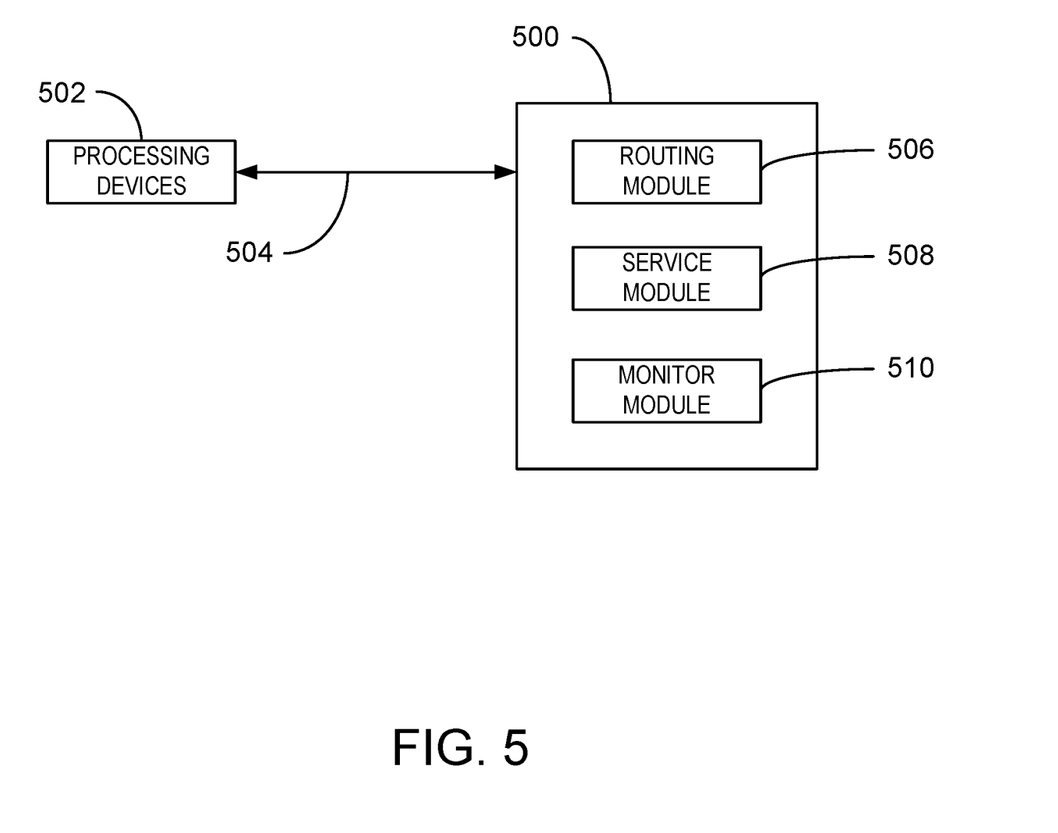
FIG. 5 is a block diagram of an example computer-readable storage media for providing network services.

FIG. 5 is a block diagram of an example computer-readable storage media for providing network services. The tangible, computer-readable storage media 500 may be accessed by processing devices 502 over a computer bus 504. Furthermore, the tangible, computer-readable storage media 500 may include code to direct the processing devices 502 to perform the steps of the current method.

The various software components discussed herein may be stored on the tangible, computer-readable storage media 500, as indicated in FIG. 5. For example, the tangible computer-readable storage media 500 can include a routing module 506, a service module 508, and a monitor module 510. The routing module 506 may be configured to receive a network packet from a source device at a first processing device. The service module 508 may be configured to process the network packet based on an enabled service application at a second processing device. For example, the enabled service application can be an antivirus scanner or an IoT application. The routing module 506 can also be configured to send the processed network packet to a destination device.

In some examples, the monitor module 510 can be configured to monitor the second processing device and determine whether the second processing device is responsive or unresponsive. In some examples, the routing module 506 may be configured to send the network packet to the second processing device if the second processing device is responsive and send the network packet directly to a destination device if the second processing device is unresponsive.

It is to be understood that any number of additional software components not shown in FIG. 5 may be included within the tangible, computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

This example provides for an example system for providing network services. The example system includes a routing subsystem to receive a network packet from a source device and send the network packet to a destination device. The example system also includes a service subsystem to receive the network packet from the routing subsystem if a service is enabled. The service subsystem can also modify the network packet or replace the network packet with a new packet based on the enabled service. The service subsystem can further also send the modified network packet or the new packet to the routing subsystem. The routing subsystem is to forward the modified network packet or the new packet to a destination address in response to receiving the modified network packet or the new packet from the service subsystem. Alternatively, or in addition, the service subsystem can modify the network packet by removing a portion of the network packet. Alternatively, or in addition, the routing subsystem and the service subsystem each include a distinct virtual processor. Alternatively, or in addition, the routing subsystem can further create a virtual local area network to associate with the service subsystem. Alternatively, or in addition, the routing subsystem further includes a monitoring engine to monitor a service on the service subsystem and restart the service on the service subsystem in response to the monitoring engine detecting that the service is unresponsive. Alternatively, or in addition, the monitoring engine can further restart the service subsystem in response to the monitoring engine detecting that the service subsystem is unresponsive. Alternatively, or in addition, the routing subsystem can send the network packet directly to the destination device in response to the monitoring engine detecting that the service or the service subsystem is unresponsive. Alternatively, or in addition, the routing subsystem can further assign internet protocol addresses to the virtual local area network that are undiscoverable outside of the routing subsystem. Alternatively, or in addition, the routing subsystem includes a first processor and the service subsystem includes a second processor, the first processor to be coupled to the second processor via a network connection. Alternatively, or in addition, the routing subsystem includes a first processor and the service subsystem includes a second processor, wherein the first processor and the second processor reside on a single circuit board and are to be coupled via a computer bus.

EXAMPLE 2

This example provides for an example method for providing network services. The example method includes receiving, via a first processor, a network packet from a source device. The example method includes sending, via the first processor, the network packet to a second processor in response to detecting that a service subsystem and a service are responsive. The example method also includes modifying, via the second processor, the network packet or generating a new network packet based on the service. The example method further includes receiving, via the first processor, the modified network packet or the new network packet from the second processor. The example method also further includes sending, via the first processor, the modified network packet or the new network packet to a destination device. Alternatively, or in addition, modifying the network packet comprises removing a portion of the network packet in response to detecting a potential virus or malware. Alternatively, or in addition, the example method may include sending, via the first processor, the modified network packet or the new network packet directly to a destination device. Alternatively, or in addition, the example method may include monitoring, via the first processor, the service subsystem and the service and determining whether the service and the service subsystem is responsive or unresponsive and sending, via the first processor, the network packet directly to the destination device in response to detecting that the service or the service subsystem is unresponsive. Alternatively, or in addition, monitoring the second processor may include receiving, via the first processor, registration packets from the service subsystem and the service and a list of listening ports. Alternatively, or in addition, monitoring the second processor may include sending, via the first processor, a ping packet to the service subsystem and the service via the listening ports. Alternatively, or in addition, monitoring the second processor may include monitoring, via the first processor, for a response packet in response to the ping packet. Alternatively, or in addition, monitoring the second processor may include restarting, via the first processor and the second processor, the service subsystem, the service, or both, if the response packet is not received by the first processor within a predetermined time. Alternatively, or in addition, the example method may further include sending, via the first processor, additional ping packets to the service subsystem and the service if additional corresponding response packets are received by the first processor within the predetermined amount of time. Alternatively, or in addition, the example method may further include creating, via the first processor, a dedicated virtual local area network to associate with the service subsystem and the service. Alternatively, or in addition, creating the dedicated virtual local area network further includes assigning, via the first processor, internet protocol (IP) addresses to the service subsystem and the service, wherein the IP addresses are undiscoverable outside of the routing subsystem. Alternatively, or in addition, the example method may further include enabling the service via the second processor, wherein the network packet is to be modified based on the enabled service by removing a portion of the network packet or replacing the network packet with a new packet.

EXAMPLE 3

This example provides for an example one or more computer-readable memory storage devices for storing computer readable instructions that, when executed by one or more processing devices, instruct the provision of network services. The computer-readable instructions may include code to receive a network packet from a source device at a first processing device. The computer-readable instructions may include code to monitor a second processing device and determine whether the second processing device is responsive or unresponsive. The computer-readable instructions may include code to process the network packet based on an enabled service application at the second processing device. The computer-readable instructions may include code to send the processed network packet to a destination device. Alternatively, or in addition, the computer-readable instructions may include code to process the network packet by removing a portion of the network packet or replacing the network packet with a new packet, wherein the new packet comprises an antivirus message. Alternatively, or in addition, the computer-readable instructions may include code to monitor the second processing device and determine whether the second processing device is responsive or unresponsive. Alternatively, or in addition, the computer-readable instructions may include code to send, via the first processing device, the network packet directly to the destination device in response to detecting that the service or the service subsystem is unresponsive. Alternatively, or in addition, the computer-readable instructions may include code to receive, via the first processing device, registration packets from the service subsystem and the service and a list of listening ports. Alternatively, or in addition, the computer-readable instructions may include code to send, via the first processing device, a ping packet to the service subsystem and the service via the listening ports via the second processing device. Alternatively, or in addition, the computer-readable instructions may include code to monitor, via the first processing device, for a response packet in response to the ping packet. Alternatively, or in addition, the computer-readable instructions may include code to restart, via the first processing device and the second processing device, the service subsystem, the service, or both, in response to detecting that the response packet was not received by the first processing device within a predetermined time. Alternatively, or in addition, the computer-readable instructions may include code to create, via the first processing device, a dedicated virtual local area network to associate with the service subsystem and the service. Alternatively, or in addition, the computer-readable instructions may include code to assign, via the first processing device, internet protocol (IP) addresses to the service subsystem and the service, wherein the IP addresses are undiscoverable outside of the routing subsystem.

EXAMPLE 4

This example provides for an example system for providing network services. The example system includes means for receiving a network packet from a source device and send the network packet to a destination device. The example system also includes means for receiving the network packet from the routing subsystem in response to detecting that a service is enabled. The example system can also include means for modifying the network packet based on the enabled service. The example system can also include means for sending the modified network packet to a means for forwarding the modified network packet to a destination address in response to receiving the modified network packet. Alternatively, or in addition, the means for receiving the network packet includes a first processor and the means for modifying the network packet includes a second processor, the first processor to be coupled to the second processor via a bus. Alternatively, or in addition, the means for receiving the network packet and the means for modifying the network packet each include a distinct virtual processor. Alternatively, or in addition, the means for receiving the network packet can further create a virtual local area network to associate with the means for modifying the network packet. Alternatively, or in addition, the means for receiving the network packet further includes means for monitoring a service on the service subsystem and restarting the service on the service subsystem in response to detecting that the service is unresponsive. Alternatively, or in addition, the means for monitoring the service can further restart the service subsystem in response to detecting that the means for modifying the network packet is unresponsive. Alternatively, or in addition, the means for receiving the network packet can send the network packet directly to the destination device in response to detecting that the means for modifying the network packet is unresponsive. Alternatively, or in addition, the means for receiving the network packet can further assign internet protocol addresses to the virtual local area network that are undiscoverable outside of the means for receiving the network packet. Alternatively, or in addition, the means for receiving the network packet includes a first processor and the means for modifying the network includes a second processor, the first processor to be coupled to the second processor via a network connection. Alternatively, or in addition, the means for receiving the network packet includes a first processor and the means for modifying the network packet includes a second processor, wherein the first processor and the second processor reside on a single circuit board and are to be coupled via a computer bus.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for providing network services, comprising:
a routing subsystem to receive a network packet from a source device and send the network packet to a destination device without modifying the network packet or generating a new packet and restarting a service subsystem in response to detecting the service subsystem is non-functioning, or send the network packet to the service subsystem in response to detecting that the service subsystem is functioning; and
the service subsystem to:
receive the network packet from the routing subsystem if the service subsystem is functioning;
modify the network packet or replace the network packet with a new packet based on a service; and
send the modified network packet or the new packet to the routing subsystem, wherein the routing subsystem is to forward the modified network packet or the new packet to the destination device in response to receiving the modified network packet or the new packet from the service subsystem.

2. The system of claim 1, wherein the service subsystem is to modify the network packet by removing a portion of the network packet.

3. The system of claim 1, wherein the routing subsystem and the service subsystem each comprise a distinct virtual processor.

4. The system of claim 1, wherein the routing subsystem and the service subsystem each comprise a distinct virtual processor, wherein the routing subsystem is to further create a virtual local area network to associate with the service subsystem.

5. The system of claim 4, wherein the routing subsystem is to further assign internet protocol addresses to the virtual local area network that are undiscoverable outside of the routing subsystem.

6. The system of claim 1, wherein the routing subsystem further comprises a monitoring engine to monitor the service on the service subsystem and restart the service on the service subsystem or restart the service subsystem in response to the monitoring engine detecting that the service is unresponsive.

7. The system of claim 6, wherein the routing subsystem can send the network packet directly to the destination device in response to the monitoring engine detecting that the service or the service subsystem is unresponsive.

8. The system of claim 1, wherein the routing subsystem is to further create a virtual local area network to associate with the service subsystem.

9. The system of claim 1, wherein the routing subsystem comprises a first processor and the service subsystem comprises a second processor, the first processor to be coupled to the second processor via a network connection.

10. The system of claim 1, wherein the routing subsystem comprises a first processor and the service subsystem comprises a second processor, wherein the first processor and the second processor reside on a single circuit board and are to be coupled via a computer bus.

11. A method for providing network services, comprising:
receiving, via a first processor dedicated to execute routing on a routing subsystem of a network device, a network packet from a source device;
in response to detecting a service subsystem of the network device to be functioning, the service subsystem having a second processor:
(a) sending, via the first processor, the network packet to the second processor of the service subsystem;
(b) modifying, via the second processor, the network packet or generating a new packet based on a service;
(c) receiving, via the first processor, the modified network packet or the new network packet from the second processor; and
(d) sending, via the first processor, the modified network packet or the new network packet to a destination device; and
in response to detecting the service subsystem of the network device to be non-functioning, sending, via the first processor, the network packet to the destination device without modifying the network packet or generating a new packet based on the service and restarting, via the first processor, the service subsystem.

12. The method of claim 11, wherein modifying the network packet comprises removing a portion of the network packet in response to detecting a potential virus or malware.

13. The method of claim 11, further comprising:
monitoring, via the first processor, the service subsystem and the service and determining whether the service and the service subsystem is responsive or unresponsive; and
sending, via the first processor, the network packet directly to the destination device in response to detecting that the service or the service subsystem is unresponsive.

14. The method of claim 13, wherein monitoring the second processor further comprises:
receiving, via the first processor, registration packets from the service subsystem and the service and a list of listening ports;
sending, via the first processor, a ping packet to the service subsystem and the service via the listening ports; and
monitoring, via the first processor, for a response packet in response to the ping packet; and
restarting, via the first processor and the second processor, the service subsystem, the service, or both, in response to detecting that the response packet is not received by the first processor within a predetermined amount of time.

15. The method of claim 14, further comprising sending, via the first processor, additional ping packets to the service subsystem and the service in response to detecting that additional corresponding response packets are received by the first processor within the predetermined amount of time.

16. The method of claim 11, further comprising creating, via the first processor, a dedicated virtual local area network to associate with the service subsystem and the service.

17. The method of claim 16, wherein creating the dedicated virtual local area network further comprises assigning, via the first processor, internet protocol (IP) addresses to the service subsystem and the service, wherein the IP addresses are undiscoverable outside of the routing subsystem.

18. The method of claim 11, further comprising enabling the service via the second processor, wherein the network packet is to be modified based on the enabled service by removing a portion of the network packet or replacing the network packet with the new packet.

19. One or more computer-readable storage devices for storing computer-readable instructions that, when executed by one or more processing devices, cause the one or more processing devices to:
receive a network packet from a source device at a first processing device dedicated to execute routing on a routing subsystem of a network device;
monitor a second processing device and determine whether the second processing device is functioning;
in response to detecting a service subsystem of the second processing device is functioning, modify the network packet or generate a new packet based on a service at the second processing device and send the modified network packet or the new network packet to a destination device; and
in response to detecting the service subsystem of the network device to be non-functioning, send the network packet to the destination device and restarting the service subsystem.

20. The one or more computer-readable storage devices of claim 19, further comprising instructions to modify the network packet by removing a portion of the network packet or replace the network packet with the new packet, wherein the new packet comprises an antivirus message.

* * * * *